(12) United States Patent
Wu

(10) Patent No.: US 7,586,749 B2
(45) Date of Patent: Sep. 8, 2009

(54) PROTECTING CASING FOR TRANSDUCER

(75) Inventor: Dick Wu, Tucheng (TW)

(73) Assignee: Finetek Co., Ltd., Taipei Hsien (TW)

( * ) Notice: Subject to any disclaimer, the term of this patent is extended or adjusted under 35 U.S.C. 154(b) by 0 days.

(21) Appl. No.: 11/956,723

(22) Filed: Dec. 14, 2007

(65) Prior Publication Data

US 2009/0154073 A1 Jun. 18, 2009

(51) Int. Cl.
*H05K 7/02* (2006.01)
(52) U.S. Cl. .................. 361/730; 361/752; 361/728; 361/283.1; 174/520; 73/724
(58) Field of Classification Search ................ 361/728, 361/730, 736, 752, 283.1; 174/520; 73/724
See application file for complete search history.

(56) References Cited

U.S. PATENT DOCUMENTS

| | | | | |
|---|---|---|---|---|
| 4,581,841 A | * | 4/1986 | Gish | 43/26.2 |
| 4,581,941 A | * | 4/1986 | Obermann et al. | 73/728 |
| 5,159,525 A | * | 10/1992 | Tate | 361/283.1 |
| 5,329,819 A | * | 7/1994 | Park et al. | 73/724 |
| 5,343,757 A | * | 9/1994 | Tate | 73/724 |
| 5,827,972 A | * | 10/1998 | Balcarek et al. | 73/756 |
| 5,929,754 A | * | 7/1999 | Park et al. | 340/439 |
| 6,148,674 A | * | 11/2000 | Park et al. | 73/724 |
| 6,511,337 B1 | * | 1/2003 | Fandrey et al. | 439/320 |

* cited by examine

*Primary Examiner*—Dean A. Reichard
*Assistant Examiner*—Dameon E Levi
(74) *Attorney, Agent, or Firm*—Rabin & Berdo, P.C.

(57) ABSTRACT

A protecting casing for a transducer has an outer casing, an inner casing, a circuit board and a connector. The inner casing is detachably mounted in the outer casing and has a mounting hole and a cap detachably mounted on the inner casing to cover the mounting hole in a watertight manner. The circuit board is detachably mounted in the inner casing and has a surface, a circuit formed on the surface and a plug with terminals extends out of the inner casing. The connector is detachably mounted to the outer casing and is electrically connected between the circuit board and an external functional accessory component. Within such an arrangement to facilitate maintenance, assembly of the transducer, and effectively avoid intrusion of water, foreign object and the like.

9 Claims, 3 Drawing Sheets

PROTECTING CASING FOR TRANSDUCER

BACKGROUND OF THE INVENTION

1. Field of the Invention

The present invention relates to a transducer, and more particularly to a protecting casing for a transducer for facilitating maintenance, assembly of the transducer, and preventing intrusion of liquids, foreign objects and the like.

2. Description of Related Art

Transducers including, but not limited to fluid meters, liquid leveling sensors, position detectors and the like comprise a housing, various sensor or operating components and a circuit board for controlling the sensor.

Generally, the housing comprises two shells mounted together using fasteners such as screws or pins to prevent intrusion of foreign objects or liquids. The circuit board is mounted securely in the housing. The circuit board has a surface and a circuit formed on the surface. The circuit is connected to a power supply and may be connected electronically to a processor. The wires protrude out of the housing and electrically connect to external components to actuate external components.

However, water or foreign objects may permeate or intrude into the housing and damage the circuit board. Furthermore, if the circuit board breaks or malfunctions, the wires must be disconnected from the circuit board and the circuit board removed from the housing for replacement or repair, which is a long, awkward process that may damage the circuit board.

To overcome the shortcomings, the present invention provides a protecting casing for a transducer for a notebook computer to obviate or mitigate the aforementioned problems.

SUMMARY OF THE INVENTION

The main objective of the present invention is to provide a protecting casing for a transducer for facilitating maintenance, assembly of the transducer and effectively avoiding intrusion of water, foreign object and the like.

To achieve the objective, the protecting casing for a transducer comprises an outer casing, an inner casing, a circuit board and a connector.

The outer casing has a base and a cover detachably mounted to each other and a receiving space defined in the base.

The inner casing is detachably mounted in the receiving space and has a mounting hole, a cap, a through hole and a neck. The cap is detachably mounted on the inner casing to cover the mounting hole. The neck protrudes from the inner casing around the through hole.

The circuit board is detachably embedded in the inner casing and can be depart from the inner casing though the mounting hole of the inner casing. The circuit board has a surface, a circuit and a plug. The circuit is formed on the surface of the circuit board. The plug has an end and multiple terminals formed thereon, which protrudes from the through hole of the inner casing and is disposed in the neck of the inner casing with the end extending out of the neck.

The connector corresponds and mounts to the neck of the inner casing in a watertight manner and has a socket assembly and at least one wire. The socket assembly may electrically connect detachably with the plug of the circuit board. The wire electrically connects between the socket assembly and an external functional accessory component, thus allows the circuit board to exchange digital data with the external functional accessory component When the circuit board is broken, maintaining personnel may directly pull out the inner casing from the outer casing, then conveniently take the circuit board out from the mounting hole of the inner casing for replacement or repairing.

Furthermore, due to the protection provided by the inner casing, the circuit board is effectively kept from being damaged by water or foreign object intruding into the outer casing.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
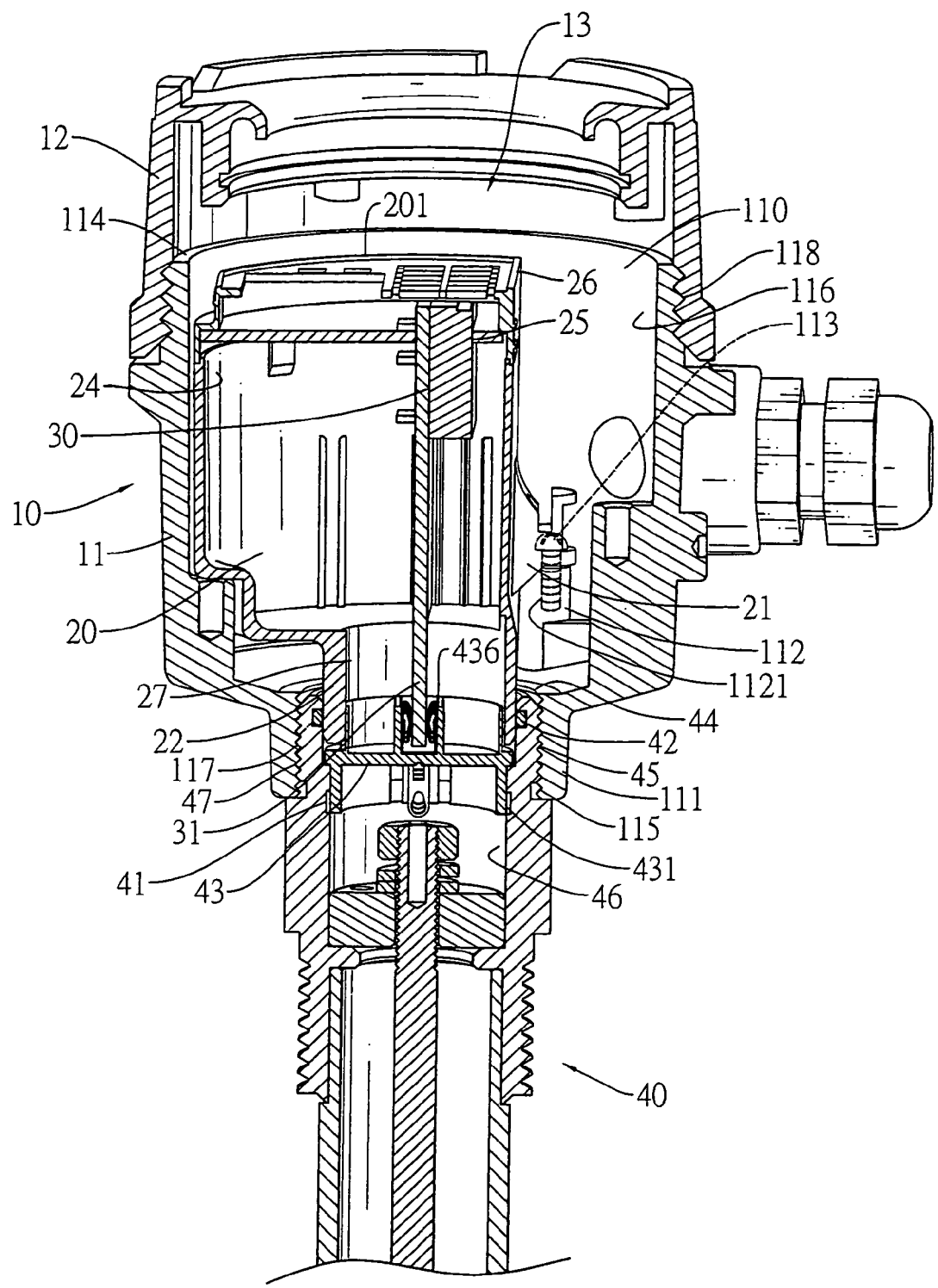
FIG. 1 is a side view in partial section of a protecting casing for a transducer in accordance with the present invention showing an inner casing.
Figure 2:
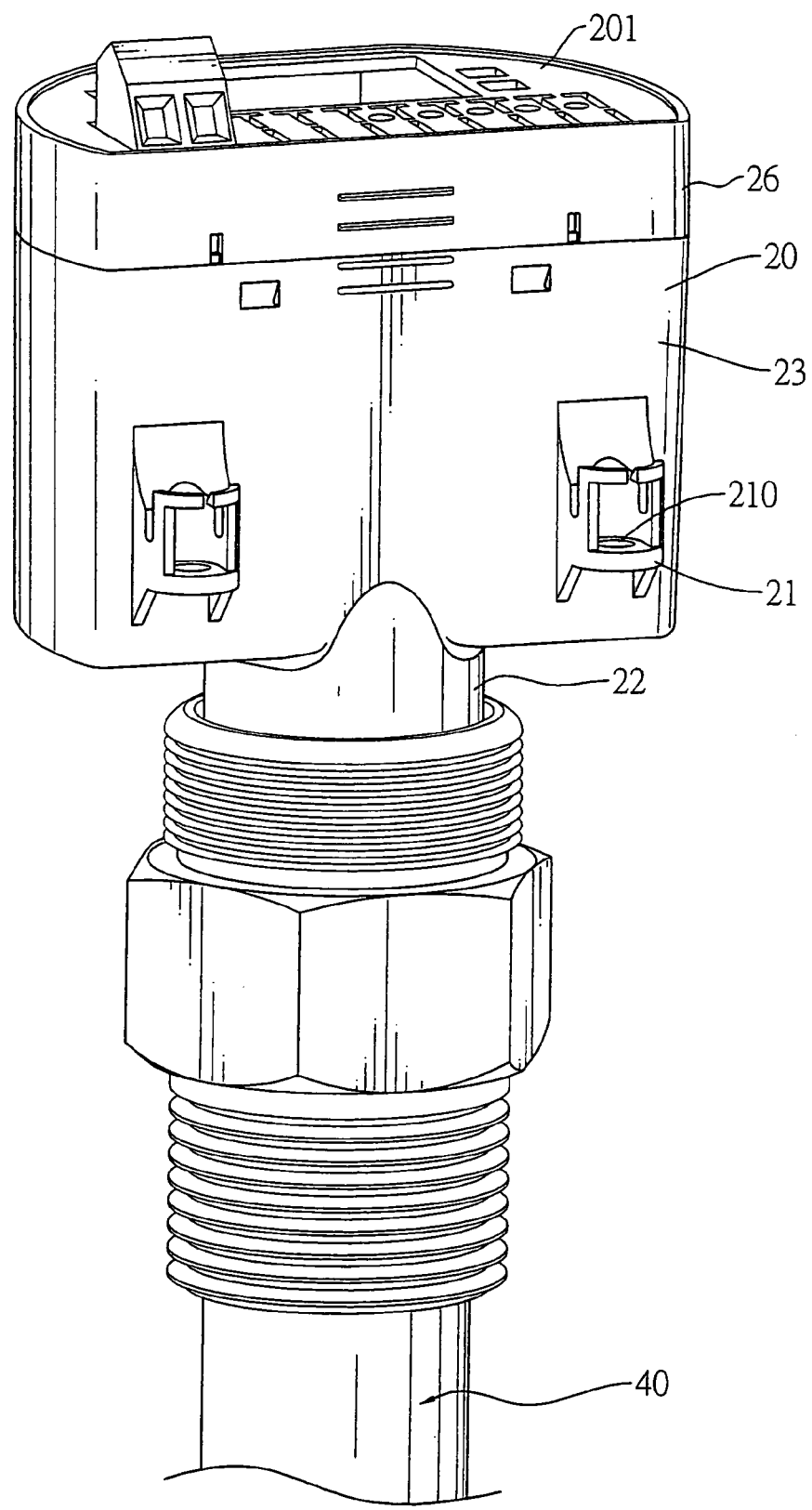
FIG. 2 is a perspective view of the inner casing of the protecting casing in FIG. 1.

With reference to FIGS. 1 and 2, a protecting casing for a transducer in accordance with present invention comprises an outer casing (10), an inner casing (20), a circuit board (30) and a connector (40).

The outer casing (10) has a base (11), a cover (12) and a receiving space (13) defined inside the base (11) and the cover (12). The base (11) has a top (114), a bottom (115), an inner-surface (116), an opening (110), an aperture (117), multiple mounting stages (112), an upper thread (118) and an annular lip (111).

The inner surface (116) is defined inside the base (11). The opening (110) is formed in the top (114) of the base (11). The aperture (117) is defined in the bottom (115) of the base (11). The mounting stages (112) are formed on the inner surface (116) of the base (11), and each mounting stage (112) has a threaded hole (1121) and a fastener (113) mounted in the threaded hole (1121). The upper thread (118) is formed on the top (114) of the base (11) around the opening (110). The annular lip (111) is formed on and protrudes from the bottom (115) of the base (11) around the aperture (117) and has an inner thread. The cover (12) is mounted on the base (1) and has a thread corresponding to and being mounted securely on the upper thread (118) of the base (11).

The inner casing (20) is detachably mounted within and sealed at the receiving space (13) and has a front surface (23), an inner surface (24), a mounting hole (25), a cap (26), a through hole (27), a neck (22), multiple mounting brackets (21) and at least two optional grooves. The cap (26) is detachably mounted on the inner casing (20) to cover the mounting hole (25). The neck (22) protrudes from the inner casing (20) and is located in the outer casing (10). The through hole (27) is formed through the neck (22) and corresponds to and connects to the aperture (117) of the base (11). The mounting brackets (21) are formed on the front surface (23) and are mounted respectively in the mounting stages (112). Each mounting bracket (21) has a securing hole (210) mounted around the fastener (113) in the threaded hole (1121) of a corresponding mounting stage (112), thereby removably mounting the inner casing (20) securely in the receiving space (13) of the outer casing (10). The grooves are formed oppositely on the inner surface (24) of the inner casing (20).

Figure 3:
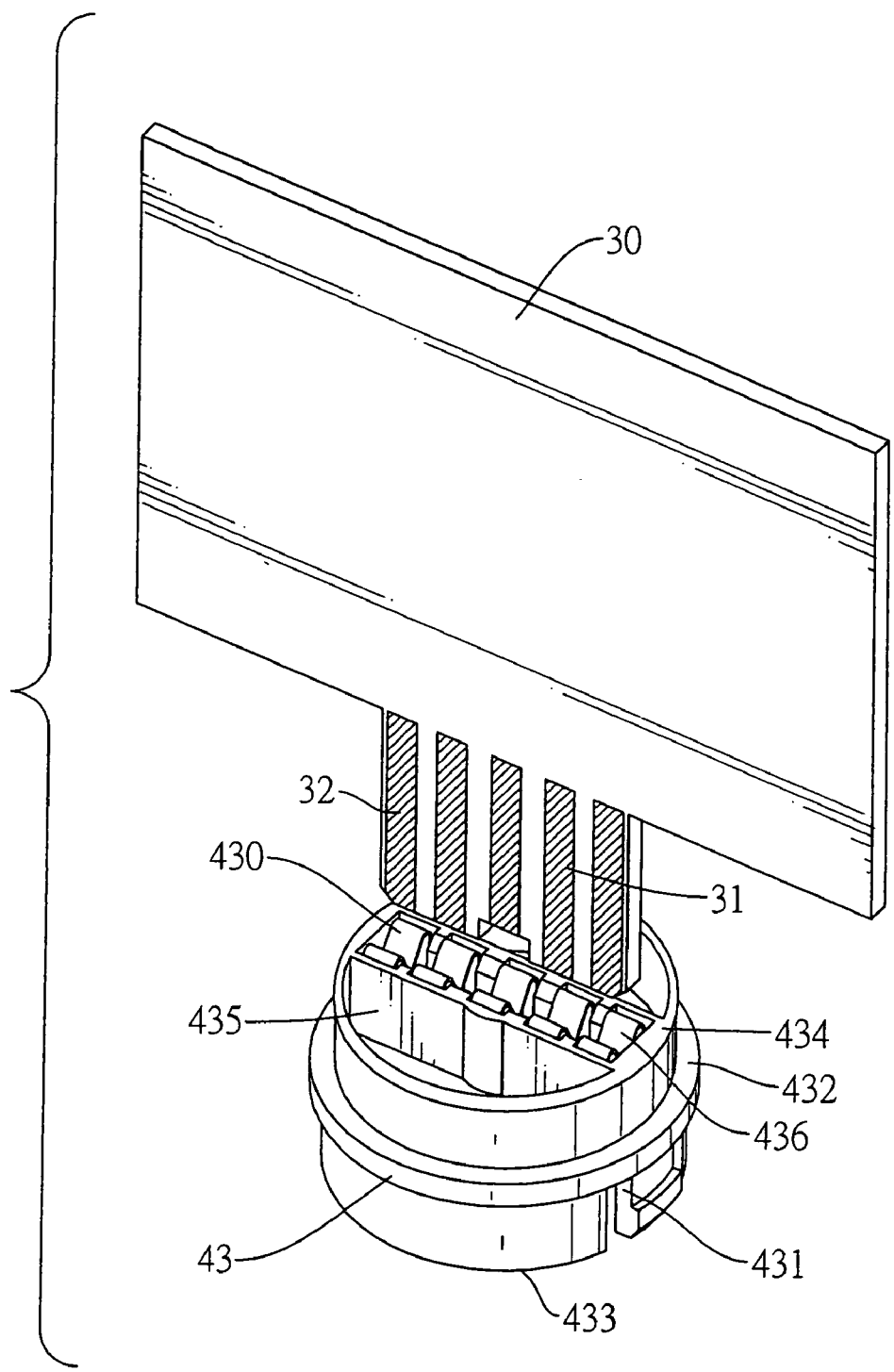
FIG. 3 is a perspective view of internal elements of the inner casing in FIG. 2.

With further reference to FIG. 3, the circuit board (30) is detachably mounted in the grooves of the inner casing (20), then is covered by the cap (26) and can be removed from the inner casing (20) though the mounting hole (25) of the inner casing (20). The circuit board (30) has a surface, a circuit and a plug (31). The circuit is formed on the surface of the circuit board (30). The plug (31) formed on the circuit board and has multiple terminals (32) formed thereon, which protrudes through the through hole (27) of the inner casing (20) and is disposed in the neck (22) of the inner casing (20).

The connector (40) is detachably mounted around the neck (22) of the inner casing (20) and has a top (44), an outer surface (45), an inner surface (46), an outer thread (47), at least one seal (42), two recesses (41), a socket assembly (43) and at least one wire. The outer thread (47) is formed in the outer surface (45) around the top (44) of the connector (40), is threaded and engages the inner thread of the annular lip (111), thereby removably holding the connector (40) securely on the base (11). The at least one seal (42) may be plastic, rubber or the like, is mounted in the inner surface (46) near the top (44) of the connector (40) and abuts the neck (22) of the inner casing (20) to seal the inner casing (20) against foreign objects or liquids. The recesses (41) are oppositely formed in the inner surface (46) of the connector (40).

The socket assembly (43) is mounted securely in the top (44) of the connector (40) and has a top (432), a bottom (433), an annular guide (434), a socket (435), multiple plug clamps (430) and two resilient tabs (431). The annular guide (433) is formed on the top (432) of the socket assembly (43) corresponding to and mounted in the neck (22) of the inner casing (20). The socket (435) is transversely defined in the annular guide (433). The plug clamps (430) are mounted in the socket (435), and each plug clamp (430) comprises two resilient metal strips (436) corresponding to and abutting the terminals (32) of the plug (31) to allow electronic transmission. The resilient tabs (431) are formed oppositely in the bottom (433) of the socket assembly (43) and respectively engage the recesses (41) of the connector (40), thereby securely holding the socket assembly (43) in the connector (40). The wire is mounted inside the connector (40) and has two ends. One of the ends electrically connects to the plug clamps (430) of the socket assembly (43), and the other end electrically connects to an external functional accessory component, such as pressure sensor, temperature sensor, leveling detector or the like and allows the circuit board (30) to exchange digital data with the external functional accessory component.

When the circuit board (30) is broken, the cover (12) may be detached from the base (11), then the inner casing (20) slid out of the outer casing (10) since the connection between the plug (31) and the plug clamps (430) are plug and socket type. Then circuit board (30) is removed from the inner casing (20) for replacement or repairing.

Furthermore, due to the protection provided by the inner casing (20), the circuit board (30) is effectively kept from being damaged by water or foreign object intruding into the outer casing (10).

Even though numerous characteristics and advantages of the present invention have been set forth in the foregoing description together with details of the structure and function of the invention, the disclosure is illustrative only. Changes may be made in detail especially in matters of shape, size and arrangement of parts within the principles of the invention to the full extent indicated by the broad general meaning of the terms in which the appended claims are expressed.

What is claimed is:

1. A protecting casing for a transducer comprising
   an outer casing having a base, the base having a top, a bottom, an inner surface being defined inside the base, and an aperture disposed at the bottom of the base, a cover detachably mounted to the base, and a receiving space defined inside the base and the cover;
   an inner casing detachably mounted within and sealed at the receiving space of the outer casing, the inner casing having an inner surface, a mounting hole, a cap detachably mounted on the inner casing to cover the mounting hole, a neck protruding from the inner casing and located in the outer casing, and the neck having a through hole being formed therethrough and corresponding to the aperture of the base;
   a circuit board being detachably mounted in the inner casing, the circuit board having a plug protruding through the through hole of the inner casing, the plug having multiple terminals formed thereon, and
   a connector detachably mounted around the neck of the inner casing, the connector having a top, an outer surface, an inner surface, at least one seal mounted in the inner surface near the top of the connector and abutting the neck of the inner casing to seal the inner casing, and a socket assembly mounted securely in the top of the connector, the socket assembly having a socket electrically connecting with the plug of the circuit board.

2. The protecting casing for a transducer as claimed in claim 1, wherein the end of the plug is disposed in the neck of the inner casing with the end of the plug extending out of the neck.

3. The protecting casing for a transducer as claimed in claim 1, wherein the socket assembly further includes
   a top;
   a bottom; and
   multiple plug clamps being mounted in the socket, each plug clamp including two resilient metal strips corresponding to and abutting the terminals of the plug.

4. The protecting casing for a transducer as claimed in claim 1, wherein
   the socket assembly further has an annular guide formed on the top of the socket assembly corresponding to and mounted in the neck of the inner casing, and
   the socket is transversely defined in the annular guide.

5. The protecting casing for a transducer as claimed in claim 1, wherein
   the connector further has two recesses being oppositely formed in the inner surface of the connector; and
   the socket assembly further has two resilient tabs being formed oppositely in the bottom of the socket assembly and respectively engaging the recesses of the connector, thereby securely holding the socket assembly in the connector.

6. The protecting casing for a transducer as claimed in claim 1, wherein
   the base of the outer casing further has
      an opening being formed in the top of the base; and
      an upper thread being formed on the top of the base around the opening; and
   the cover further has a thread corresponding to and being mounted securely on the upper thread of the base.

7. The protecting casing for a transducer as claimed in claim 1, wherein
   the base further has multiple mounting stages being formed on the inner surface of the base, and each mounting stage having a threaded hole and a fastener mounted in the threaded hole; and
   the inner casing further has
      a front surface; and
      multiple mounting brackets being formed on the front surface and being mounted respectively in the mounting stages, each mounting bracket having a securing hole mounted around the fastener in the threaded hole of a corresponding mounting stage, thereby removably mounting the inner casing securely in the receiving space of the outer casing.

8. The protecting casing for a transducer as claimed in claim 1, wherein
   the base of the outer casing further has
      an annular lip being formed on and protruding from the bottom of the base around the aperture and having an inner thread; and
   the connector further has an outer thread being formed in the outer surface around the top of the connector and being threaded with the inner thread of the annular lip, thereby connecting the connector to the base.

9. The protecting casing for a transducer as claimed in claim 1, wherein
   the inner casing further has at least two grooves being formed oppositely on the inner surface of the inner casing; and
   the circuit board being detachably mounted in the grooves of the inner casing.

* * * * *